United States Patent
Bezawada et al.

(10) Patent No.: US 10,289,182 B2
(45) Date of Patent: May 14, 2019

(54) INTRINSICALLY SAFE POWER CONDITIONING CIRCUIT

(71) Applicant: Honeywell International Inc., Morris Plains, NJ (US)

(72) Inventors: Murali Krishna Bezawada, Telangana (IN); Bart Meijer, Zuid Holland (NL); John Boettger, Rockledge, FL (US); Suresh Babu Dtvs, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 117 days.

(21) Appl. No.: 15/088,598

(22) Filed: Apr. 1, 2016

(65) Prior Publication Data
US 2017/0285713 A1    Oct. 5, 2017

(51) Int. Cl.
| | | |
|---|---|---|
| G06F 1/26 | (2006.01) | |
| G06F 1/30 | (2006.01) | |
| H02H 9/00 | (2006.01) | |
| G06F 1/28 | (2006.01) | |
| H02M 3/04 | (2006.01) | |
| H04W 88/08 | (2009.01) | |
| H02H 3/02 | (2006.01) | |
| H02H 3/087 | (2006.01) | |

(52) U.S. Cl.
CPC ............. *G06F 1/30* (2013.01); *G06F 1/266* (2013.01); *G06F 1/28* (2013.01); *H02H 9/008* (2013.01); *H02M 3/04* (2013.01); *H04W 88/08* (2013.01); *H02H 3/023* (2013.01); *H02H 3/025* (2013.01); *H02H 3/087* (2013.01)

(58) Field of Classification Search
None
See application file for complete search history.

(56) References Cited

U.S. PATENT DOCUMENTS

| | | | |
|---|---|---|---|
| 4,360,850 A * | 11/1982 | Howard | B41F 9/001 361/54 |
| 7,723,950 B2 | 5/2010 | Spartano et al. | |
| 8,791,675 B2 | 7/2014 | Black | |
| 2004/0178778 A1 * | 9/2004 | Bansal | G05F 1/575 323/274 |
| 2007/0177320 A1 * | 8/2007 | Tokumaru | G06F 1/26 361/90 |
| 2012/0081058 A1 * | 4/2012 | Bortolus | H02K 11/001 318/490 |
| 2017/0322421 A1 * | 11/2017 | Hunter | G02B 27/0176 |

* cited by examiner

*Primary Examiner* — Paul Yen

(57) ABSTRACT

A power conditioning circuit includes at least one power storage device having electrodes coupled for receiving power from a DC power source. At least one active current limit (ACL) circuit coupled to the electrodes of the power storage device is for limiting a maximum power output from the power storage device under fault conditions. A DC-to-DC converter has its inputs coupled to the ACL circuit. At least one crowbar circuit has a first terminal and a second terminal and a shorting device coupled to an output of the DC-to-DC converter for providing output terminals for the power conditioning circuit.

20 Claims, 3 Drawing Sheets

INTRINSICALLY SAFE POWER CONDITIONING CIRCUIT

FIELD

Disclosed embodiments relate to intrinsically safe power conditioning circuits and power supplies, such as for powering cellular modems.

BACKGROUND

Cellular modems need high peak power (e.g., 6 W or 7 W) for wirelessly transmitting data over the cellular network. In order to operate in hazardous locations such as petrochemical industries, oil and gas pipelines, and certain automation plant environments, the fault power, current, voltage and energy dissipated in the cellular modem device needs to be limited to be within the ignition energy limits of a hazardous gas, and also the surface temperature of the cellular modem device under fault conditions needs to be limited to be within ignition temperature limits of hazardous gases. A simple known approach is using infallible resistors (film type resistors whose failure mode is only an open circuit) for power and current limiting and infallible zener diodes for limiting the voltage.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize as cellular modems need high peak power (e.g., 6 W or 7 W) for wirelessly transmitting data over the cellular network, achieving intrinsic safety using conventional resistors and zener diodes will make modem power supply significantly lossy and also make it difficult to meet required battery life (e.g., 5 years) and size constraints as high power zener diodes are generally too large in size. Disclosed intrinsically safe (IS) power conditioning circuits provide high efficiency power supplies by including a power storage device such as a supercapacitor or battery, Active Current Limiting (ACL) circuit(s), a DC-to-DC converter and a crowbar circuit(s).

The ACL circuit(s) placed between the power storage device and DC-to-DC converter helps in supplying low ripple and regulated power to the cellular modem. The ACL circuit limits the fault current, power to the cellular modem and other electronic components. The ACL circuit also acts like a fuse for protecting crowbar circuit(s) under fault conditions, eliminating the need to place an additional fuse for the crowbar circuit(s).

One disclosed embodiment comprises a power conditioning circuit that includes at least one power storage device (e.g., supercapacitor/battery) having electrodes coupled for receiving power from a DC power source. At least one ACL circuit is coupled to the electrodes of the power storage device for limiting a maximum power output from the power storage device under fault conditions. A DC-to-DC converter has its inputs coupled to the ACL circuit. At least one crowbar circuit has a first terminal and a second terminal and a shorting device coupled to an output of the DC-to-DC converter for providing output terminals for the power conditioning circuit.

DETAILED DESCRIPTION

Figure 1:
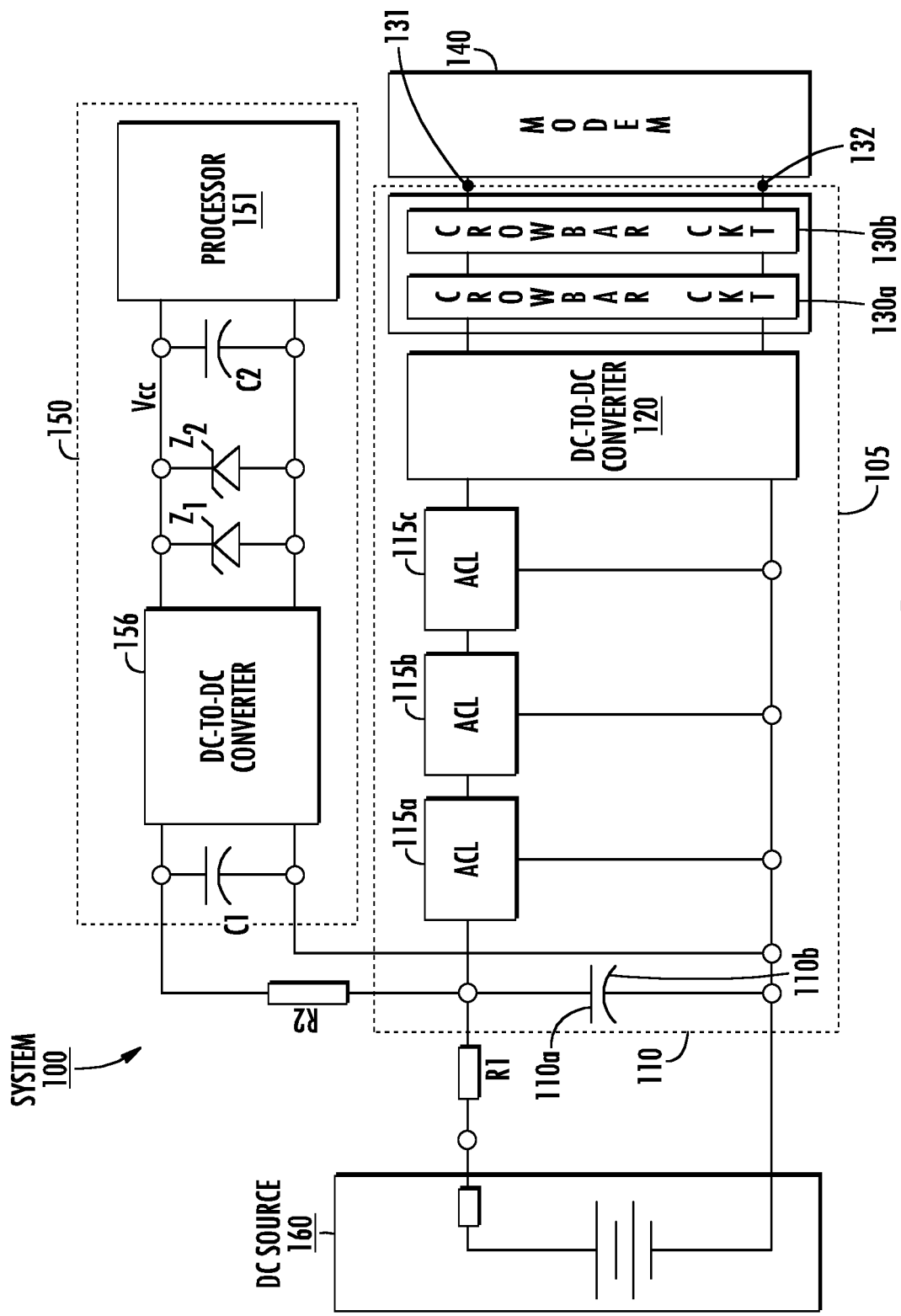
FIG. 1 is a block diagram of a cellular modem system including an example IS power conditioning circuit shown receiving power from a power supply and providing power to a cellular modem, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram of a cellular modem system 100 including an example IS power conditioning circuit 105 shown receiving power from a DC power source 160 (shown as DC source 160) and providing power to a cellular modem 140, according to an example embodiment. DC power source 160 may comprise a single battery, a battery pack (multiple batteries), a fuel cell, or a solar cell. The DC power source 160 always has current flowing in the same direction between its two terminals. Power conditioning circuit 105 includes at least one power storage device 110 having electrodes 110a, 110b for receiving power from the DC power source 160. The power storage device 110 can comprise a supercapacitor, rechargeable battery, hybrid layer capacitor or a lithium ion capacitor.

As used herein, a "supercapacitor" (sometimes also referred to as an ultracapacitor, previously an electric double-layer capacitor (EDLC)) is a high-capacity electrochemical capacitor that instead of storing electrical charge directly in dielectric materials as with conventional capacitors, use electrolyte ions which create charge storage in electrical double layers. A supercapacitor provides high-capacity with capacitance values much higher than other capacitors (but generally lower voltage limits), which typically store 10 to 100 times more energy per unit volume or mass compared to electrolytic capacitors. Supercapacitors are available commercially, such as the HLC-1550 from Tadiran Batteries North New Hyde Park, N.Y.

Supercapacitors use electrostatic double-layer capacitance or electrochemical pseudocapacitance, or a combination of both of these. Electrostatic double-layer capacitors generally use carbon electrodes or derivatives with much higher electrostatic double-layer capacitance than electrochemical pseudocapacitance, achieving separation of charge in a Helmholtz double layer at the interface between the surface of an electrically conductive electrode and an electrolyte. The separation of charge is of the order of a few angstroms, much smaller than in a conventional capacitor.

Power conditioning circuit 105 also includes at least one ACL circuit shown as ACLs 115a, 115b, 115c in series with one another coupled to the electrodes 110a, 110b of the power storage device 110. As used herein an "ACL" is a circuit which sets a maximum load current by using sensing resistors along with transistors and amplifiers (e.g., op amps) that act as ON and OFF switches. The ACL circuit(s) 115a, 115b, 115c shown placed between the power storage device 110 and the DC-to-DC converter 120 helps in supplying low ripple and regulated power to the cellular modem 140. The ACL circuit(s) 115a, 115b, 115c also act like a fuse for protecting crowbar circuit(s) 130a, 130b under fault conditions, eliminating the need to place an additional fuse for protecting the crowbar circuit(s) 130a, 130b.

The ACL circuit(s) 115a, 115b, 115c limit the fault current, power to the cellular modem and other electronic components. The ACL circuit is shown triplicated with ACL circuits 115a, 115b, 115c shown for meeting the Zone-0 intrinsic safety requirements as per International Electrotechnical Commission (IEC) 60079-11. The ACL circuit(s) provide a low value of series resistance being <0.5 ohms (e.g., <0.1 ohm) during normal operation, (i.e., ACL not triggered) which may be compared to the relatively high resistance (e.g., 1 ohm) for known/conventional power limiting. ACL circuit(s) 115a, 115b, 115c thus significantly reduce the $I^2R$ loss of the power conditioning circuit 105, which extends the lifetime of the DC power source 160.

Figure 2:
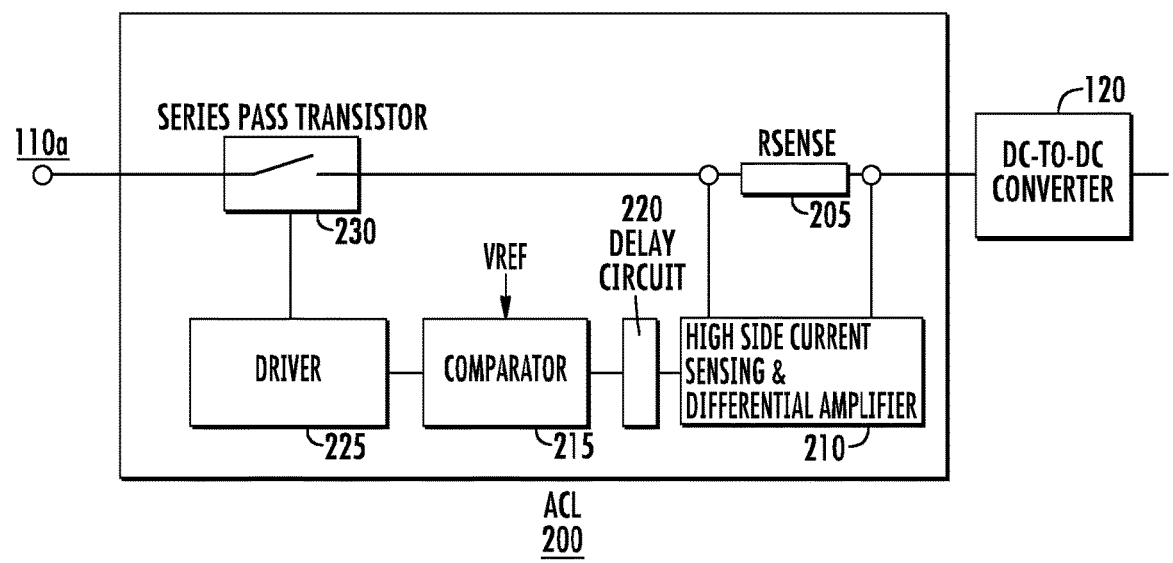
FIG. 2 is a block diagram of an example ACL circuit, according to an example embodiment.

FIG. 2 is a block diagram of an example ACL 200. Rsense 205 is a film type low ohmic infallible resistors (e.g., 0.11Ω 1%) for sensing current received from the power storage device 110. As noted above an infallible resistor is a film type resistor whose failure mode is only an open circuit. The voltage drop across the current sense resistor 205 is amplified by a differential amplifier 210. The output of the differential amplifier 210 is fed as an input to comparator 215 through a delay circuit 220, which can comprise a programmable delay circuit. The delay circuit 220 helps in filtering noise so that the ACL 200 will not trip for short duration peak currents (<5 msec). The comparator 215 compares the output voltage of the differential amplifier 210 with an accurate shunt voltage reference (shown as Vref) and via driver 225 trips (opens) the series pass transistor (or switch) 230 when the output voltage of the differential amplifier 210 exceeds Vref.

Power conditioning circuit 105 also includes a DC-to-DC converter 120 having inputs coupled to the ACL circuits 115a, 115b, 115c. The DC-to-DC converter 120 can comprise a buck and/or boost (also known as a step-up) converter. A buck-boost converter is a type of DC-to-DC converter that has an output voltage magnitude that is either greater than or less than the input voltage magnitude that is equivalent to a flyback converter using a single inductor instead of a transformer. Other regulator types that can be used include single-ended primary-inductor converters (SEPIC) converters. DC-to-DC converter 120 maintains a constant/regulated voltage level at output terminals 131, 132 for the cellular modem 140.

Power conditioning circuit 105 also includes at least one crowbar circuit shown as crowbar circuits 130a, 130b having a first terminal and a second terminal including a shorting device coupled to an output of the DC-to-DC 120 converter for providing output terminals 131, 132 for the power conditioning circuit 105. As used herein a "crowbar circuit" is an electrical circuit including a shorting device used to prevent an overvoltage condition of a power supply unit from damaging the circuits attached to the power supply that operates by putting a short circuit or low resistance path across the voltage output (Vo).

Crowbar circuits can be implemented using a thyristor, triode thyristor (TRIAC), silicon controlled rectifier (SCR), trisil or thyratron as the shorting device. Once triggered, the crowbar circuit pulls the voltage to low, usually close to ground. A clamp prevents the voltage from exceeding a preset level. Thus, a crowbar circuit will not automatically return to normal operation when the overvoltage condition is removed; power needs to be removed entirely either by current-limiting circuitry of the power supply or, if that fails, the blowing of the line fuse to stop its conduction. The crowbar circuit is shown duplicated in FIG. 1 with first and second crowbar circuits 130a, 130b provided to meet a Zone-0 IS requirement.

Figure 3:
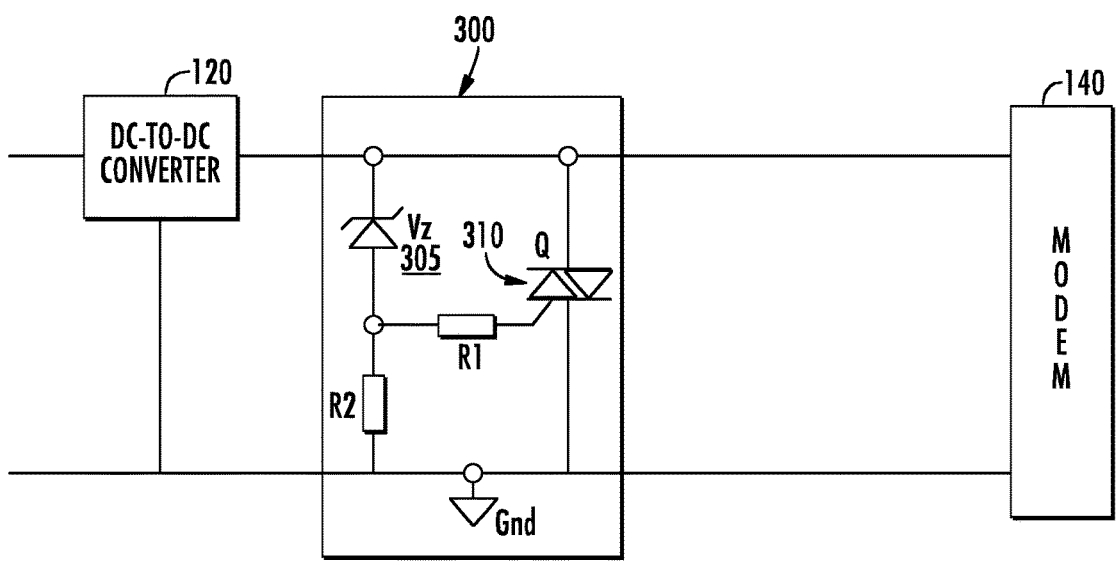
FIG. 3 is a schematic of example crowbar circuit, according to an example embodiment.

FIG. 3 is a schematic of example crowbar circuit 300, according to an example embodiment. The crowbar circuit 300 includes a zener diode 305 that controls the voltage at the gate of the TRIAC 310. The resistor shown as R1 limits the current through the gate of the TRIAC 310 and the resistor shown as R2 limits current through the Zener diode 305. The clamping voltage of Zener diode 305 is set so that during normal operating conditions the voltage across the Zener diode 305 (Vz) is lower than clamping voltage of Vz. Since this voltage is below the Zener clamping voltage, the Zener diode 305 remains off and very little current (<0.1 mA) is conducted through the cathode of the Zener diode 305. R2 will bypass this current so that the gate of the TRIAC 310 will remain at ground potential, keeping the TRIAC 310 off.

If the supply voltage received from the DC-to-DC converter 120 increases, the voltage across the Zener diode 305 will exceed the Zener diode 305 clamping voltage of Vz. The Zener diode 305 will than start drawing more current through it, and makes the current through the gate terminal of the TRIAC 310 exceeding the gate trigger current of the TRIAC 310. Once triggered (on), the TRIAC 310 providing an effective short circuit latches the voltage close to ground. The crowbar circuit will not automatically return to normal operation even when the overvoltage condition is removed so that power must generally be removed entirely to stop its conduction. ACL 115 at the input of the DC-to-DC converter 120 may trip the current through crowbar circuit 300 if the current flowing through ACL 115 crosses the trip current limit.

Cellular modem system 100 is shown further comprising a controller section 150 including a processor 151 which can comprise microprocessor, digital signal processor (DSP), or microcontroller unit (MCU), and a DC-to-DC converter 156 which can comprise a boost regulator, Buck/boost, SEPIC, or Flyback capacitive voltage doubler/multiplier circuit. The DC-to-DC converter 156 is resistively coupled with at least one infallible resistor (a film type resistor whose failure mode is only open circuit) shown as R2 (e.g., about 5 ohms)

to the power storage device 110 for obtaining power from the power storage device 110.

Controller section 150 is also shown including Zener diodes $Z_1$, $Z_2$ for limiting voltage under fault conditions, and capacitors $C_1$ and $C_2$ as Filter capacitors at input and output of the DC-to-DC converter 156). The ACLs 115a, 115b and 115c shown helps the cellular modem system 100 to meet a given thermal ignition rating (e.g., T4). The controller section 150 is for running communication stacks/firmware of the modem system 100 (not shown), including executing communication stacks such as Internet Protocol version 6 (IPv6) which is needed for cellular communications.

Cellular modem system 100 is also shown including infallible resistor R1 (e.g., 4 ohms) between the DC power source 160 and the power conditioning circuit 105. R1 is for limiting the fault current to a safe value from the power storage device 110 if the input/battery connector shorts.

Disclosed embodiments can be applied to generally to cellular modems. Disclosed embodiments can also be applied more generally to any device that needs efficient higher power with IS protection for its operation.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A power conditioning circuit, comprising:
at least one power storage device having electrodes coupled for receiving power from a DC power source;
at least one active current limit (ACL) circuit coupled to said electrodes of said power storage device for limiting a maximum power output from said power storage device under fault conditions wherein said active current limiter comprises of:
a differential amplifier configured to amplify a current across a sense resistor,
a comparator configured to compare the output voltage of the differential amplifier with an accurate shunt voltage reference and trip a series pass transistor through a driver;
a delay circuit, configured to filter noise to prevent tripping of the active current limit circuit for short duration peak currents;
a DC-to-DC converter having inputs coupled to said ACL circuit, and
at least one crowbar circuit having a first terminal and a second terminal including a shorting device coupled to an output of said DC-to-DC converter for providing output terminals for said power conditioning circuit.

2. The power conditioning circuit of claim 1, further comprising a controller section including a processor and a DC-to-DC converter resistively coupled with at least one infallible resistor for receiving power from said power storage device.

3. The power conditioning circuit of claim 1, wherein said power storage device comprises at least one supercapacitor.

4. The power conditioning circuit of claim 1, wherein said ACL circuit comprises a plurality of said ACL circuits in series with one another.

5. The power conditioning circuit of claim 1, wherein said ACL circuit provides a series resistance value <0.5 ohms while said ACL circuit is not triggered.

6. The power conditioning circuit of claim 1, wherein said crowbar circuit comprises a plurality of said crowbar circuits in parallel to one another.

7. The power conditioning circuit of claim 1, wherein said power storage device comprises a rechargeable battery, hybrid layer capacitor, or a lithium ion capacitor.

8. The power conditioning circuit of claim 1, wherein said DC-to-DC converter comprises a boost converter or a buck converter.

9. The power conditioning circuit of claim 1, wherein said crowbar circuit comprises at least one triode thyristor (TRIAC).

10. The power conditioning circuit of claim 1, wherein said crowbar circuit comprises at least one silicon controlled rectifier (SCR).

11. A power supply, comprising:
a DC power source;
at least one power storage device having electrodes coupled for receiving power from said DC power source;
at least one active current/power limit (ACL) circuit coupled to said electrodes of said power storage device wherein said active current limiter comprises of:
a differential amplifier configured to amplify a current across a sense resistor,
a comparator configured to compare the output voltage of the differential amplifier with an accurate shunt voltage reference and trip a series pass transistor through a driver;
a delay circuit, configured to filter noise to prevent tripping of the active current limit circuit for short duration peak currents;
a DC-to-DC converter having inputs coupled to said ACL circuit;
at least one crowbar circuit having a first terminal and a second terminal including a shorting device coupled to an output of said DC-to-DC converter for providing output terminals; and
a controller section including a DC-to-DC converter and a processor resistively coupled for receiving power from said power storage device.

12. The power supply of claim 11, wherein said power storage device comprises at least one supercapacitor.

13. The power supply of claim 11, wherein said controller section includes at least one infallible resistor and at least one Zener diode.

14. The power supply of claim 11, wherein said ACL circuit comprises a plurality of said ACL circuits in series with one another.

15. The power supply of claim 11, wherein said ACL circuit provides a series resistance value of <0.5 ohms while said ACL circuit is not triggered.

16. The power supply of claim 11, wherein said crowbar circuit comprises a plurality of said crowbar circuits in parallel to one another.

17. The power supply of claim 11, wherein said power storage device comprises a rechargeable battery, hybrid layer capacitor, or a lithium ion capacitor.

18. The power supply of claim 11, wherein said DC-to-DC converter comprises a boost converter or a buck converter.

19. The power supply of claim 11, wherein said crowbar circuit comprises at least one triode thyristor (TRIAC).

20. The power supply of claim 11, wherein said crowbar circuit comprises at least one silicon controlled rectifier (SCR).

\* \* \* \* \*